(12) United States Patent
Nolte (10) Patent No.: US 11,840,131 B2
(45) Date of Patent: Dec. 12, 2023

(54) GUIDE FOR A SLIDING GLAZING

(71) Applicant: Hutchinson GmbH, Aachen (DE)

(72) Inventor: Georg Nolte, Aachen (DE)

(73) Assignee: Hutchinson GmbH, Aachen (DE)

( * ) Notice: Subject to any disclaimer, the term of this patent is extended or adjusted under 35 U.S.C. 154(b) by 94 days.

(21) Appl. No.: 17/533,282

(22) Filed: Nov. 23, 2021

(65) Prior Publication Data
US 2022/0161639 A1   May 26, 2022

(30) Foreign Application Priority Data

Nov. 25, 2020 (EP) .................................. 20306445

(51) Int. Cl.
*B60J 5/04* (2006.01)
*B60J 10/76* (2016.01)
*B60J 1/17* (2006.01)
*B60J 10/79* (2016.01)

(52) U.S. Cl.
CPC .............. *B60J 5/0402* (2013.01); *B60J 1/17* (2013.01); *B60J 10/76* (2016.02); *B60J 10/79* (2016.02)

(58) Field of Classification Search
CPC . B60J 5/0402; B60J 10/76; B60J 10/79; B60J 1/17
USPC ..................................................... 296/146.2
See application file for complete search history.

(56) References Cited

U.S. PATENT DOCUMENTS

| | | | |
|---|---|---|---|
| 4,621,453 A * | 11/1986 | Watanabe | B60J 10/79 49/374 |
| 4,653,230 A * | 3/1987 | Seo | B60J 10/79 49/374 |
| 10,427,511 B2 * | 10/2019 | Blottiau | B60J 10/74 |
| 10,442,281 B2 * | 10/2019 | Krause | B60J 10/76 |
| 10,787,851 B2 * | 9/2020 | Freymuth | B60J 1/17 |
| 11,338,651 B2 * | 5/2022 | Baratin | E05D 15/165 |
| 2005/0229496 A1 * | 10/2005 | Tashima | B60J 10/70 49/441 |
| 2006/0037249 A1 * | 2/2006 | Kawamura | B60J 10/74 49/428 |
| 2020/0130488 A1 * | 4/2020 | Choi | B60J 10/36 |

(Continued)

FOREIGN PATENT DOCUMENTS

| | | | | |
|---|---|---|---|---|
| CN | 115107487 A | * | 9/2022 | .............. B60J 10/76 |
| FR | 2747345 A1 | | 10/1997 | |

(Continued)

OTHER PUBLICATIONS

European Search Report issued in corresponding European Patent Application No. EP 20306445 dated Apr. 15, 2021.

*Primary Examiner* — Jason S Morrow
(74) *Attorney, Agent, or Firm* — Morgan, Lewis & Bockius LLP (57) ABSTRACT

Guide for a sliding glazing, in particular for an automobile, the guide being intended to be fastened onto a glazing and to cooperate with a glass run seal, the guide comprising a body made of a single piece and having an elongated shape along an axis (A), the body comprising: a fastening portion extending along the axis (A) and having a face configured to be fastened onto the glazing, and a guide portion extending along said axis (A) and being cross sectional L-shaped, the guide portion comprising a wall substantially parallel to the face and a free rib substantially perpendicular to the face, the free rib including at least one non-planar lateral face.

17 Claims, 10 Drawing Sheets

(56) References Cited

U.S. PATENT DOCUMENTS

| | | | |
|---|---|---|---|
| 2020/0180405 A1* | 6/2020 | Blottiau | B60J 1/007 |
| 2020/0215881 A1 | 7/2020 | Baratin et al. | |
| 2022/0118829 A1* | 4/2022 | Galluccio | B60J 10/76 |
| 2022/0297518 A1* | 9/2022 | Yüksel | B60J 10/79 |

FOREIGN PATENT DOCUMENTS

| | | |
|---|---|---|
| JP | S59-182418 U | 12/1984 |
| WO | 2018/109061 A1 | 6/2018 |

\* cited by examiner

FIG. 16d

GUIDE FOR A SLIDING GLAZING

TECHNICAL FIELD

The invention relates to a guide for a sliding glazing, in particular for an automobile or motor vehicle, as well as a sliding glazing and a module equipped with such a guide.

STATE OF THE ART

States of the art includes FR-A1-2 747 345, JP-U.S. Pat. No. 59,182,418 and US-A1-2020/215881.

An automobile or a motor vehicle is generally provided with sliding glazings, i.e., glazings able to move relative to door frames for instance. For aesthetic reasons, it has already been proposed to guide a sliding glazing laterally flush with an outer surface of a vertical element of an edge of a door frame adjacent to the glazing. This vertical element is generally an upright of the frame or a vertical external trim provided on this frame, such as a "B" pillar of the vehicle. The fact that the glazing is level with respect to this vertical element is referred to as "flush", as the outer face of the glazing is located substantially in the same lateral plane as that of this vertical element.

In what follows, the qualifiers "internal" and "inner" shall usually be used to designate the position of a part laterally inwards of the motor vehicle and the qualifiers "external" and "outer" shall usually be used to designate the position of a part laterally outwards of the motor vehicle. These designations are in reference to the axial direction Y, which is by definition perpendicular to the plane XZ defined by the longitudinal horizontal direction X and by the vertical direction Z of the vehicle (see FIGS. 1 and 2).

Figure 1:
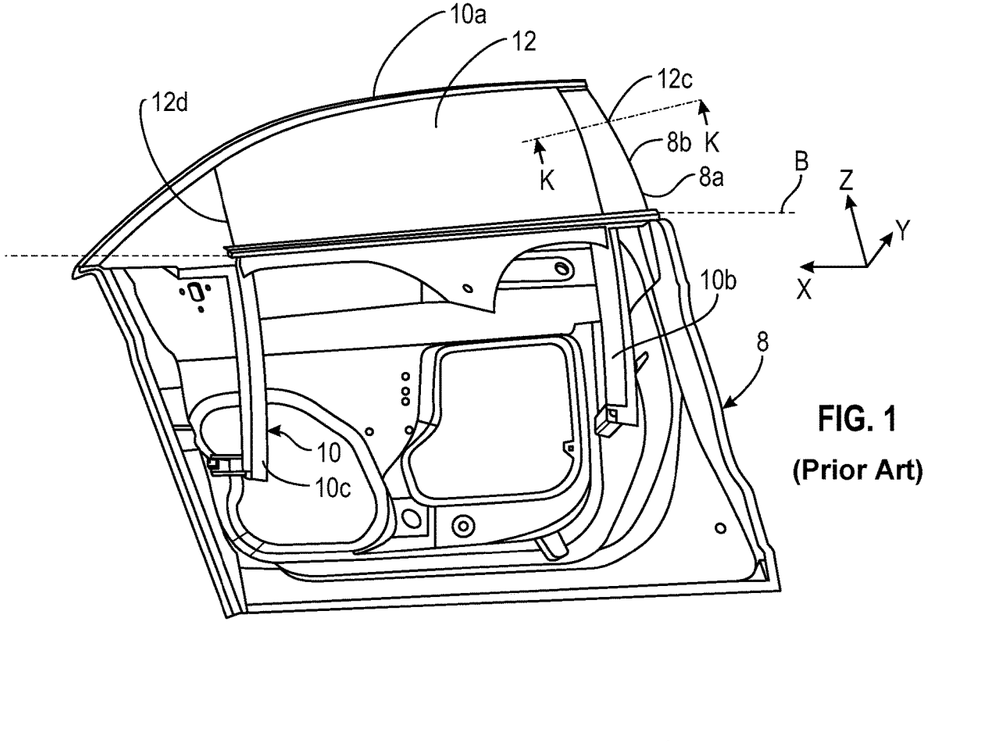
FIG. 1 is a schematic perspective view of a door frame of a motor vehicle, this door fame being equipped with a glass run seal and a sliding glazing, FIG. 1 illustrating the prior art.
Figure 2:
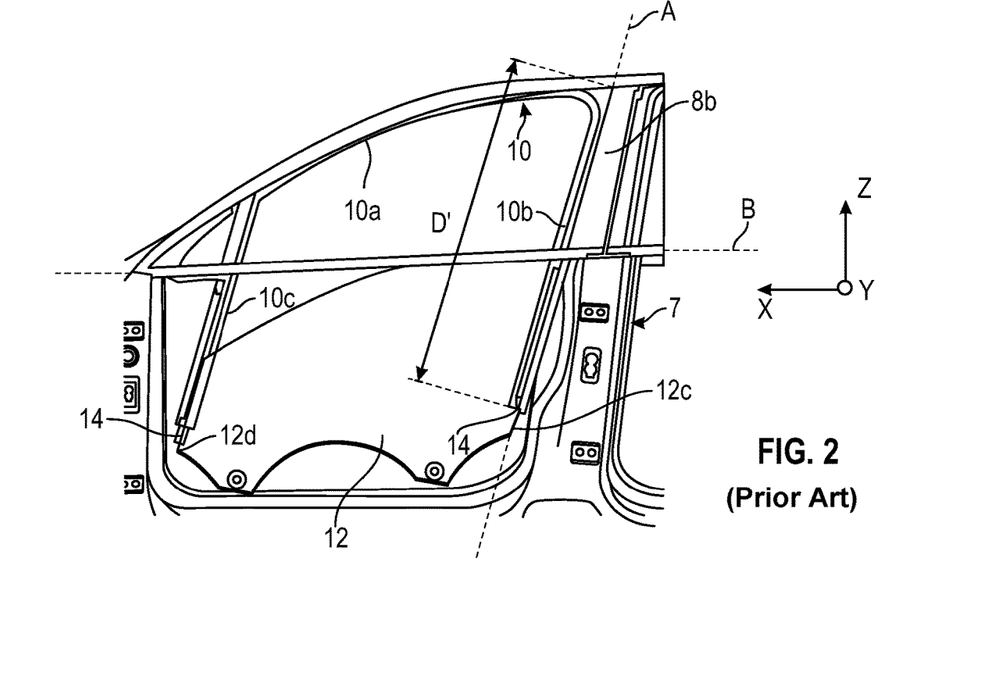
FIG. 2 is a schematic perspective view of a vehicle bodyside, the glass run seal and the sliding glazing of FIG. 1 being shown without the door frame.

In a motor vehicle, a door frame 8 is equipped with a glass run seal 10 intended to receive the sliding glazing (FIGS. 1 to 4). This sliding glazing includes a glazing 12 equipped with at least one guide 14 fastened to an inner face 12*a* of the glazing and able to guide it in a longitudinally offset manner in sliding, in the vertical direction Z, directly in a recess 16 of the glass run seal 10 or in a sliding rail in direct proximity of the sliding glass run seal. The guide 14 is for instance fastened close to a rear edge 12*c* of the glazing 12 and another guide might be fastened close to a front edge 12*d* of the glazing as shown in FIGS. 1 and 2. The door frame 8 is shown in FIG. 1 and is not shown in FIG. 2 which illustrates the position of the glass run seal 10 and of the glazing 12 with respect to a vehicle bodyside 7.

The glass run seal 10 generally comprises two ascending strands 10*b*, 10*c* connected together by an upper strand 10*a*. One or each ascending strand 10*b*, 10*c* has a transversal or cross sectional section substantially in the shape of a U that comprises two axially inner and outer branches 10*b*1, 10*b*2 connected together by a connection branch 10*b*3 (see FIG. 4). These branches 10*b*1, 10*b*2, 10*b*3 define therebetween the recess 18. The strand 10*b* is mounted onto the upright 8*a* of the frame of the corresponding door or onto the vertical trim 8*b* provided on this frame, and the outer face 12*b* of the glazing 12 laterally flushes with an outer face 8*b*1 of this trim 8*b*.

The guide 14 has an elongated shape and includes a fastening portion 14*a* and a guide portion 14*b* which are made as a single piece. The fastening portion 14*a* extends along the axis of elongation A of the guide and has a face 14*a*1 intended to be applied and fastened onto the inner face 12*a* of the glazing 12, for instance by gluing. The guide portion 14*b* extends along the axis A and comprises a wall 14*b*1 substantially parallel to the face 14*a*1 of the fastening portion 14*a* and to the glazing 12. This guide portion 14*b* is received in the recess 18 of the glass run seal 10 and cooperates by sliding with its outer branch 10*b*2.

Figure 3:
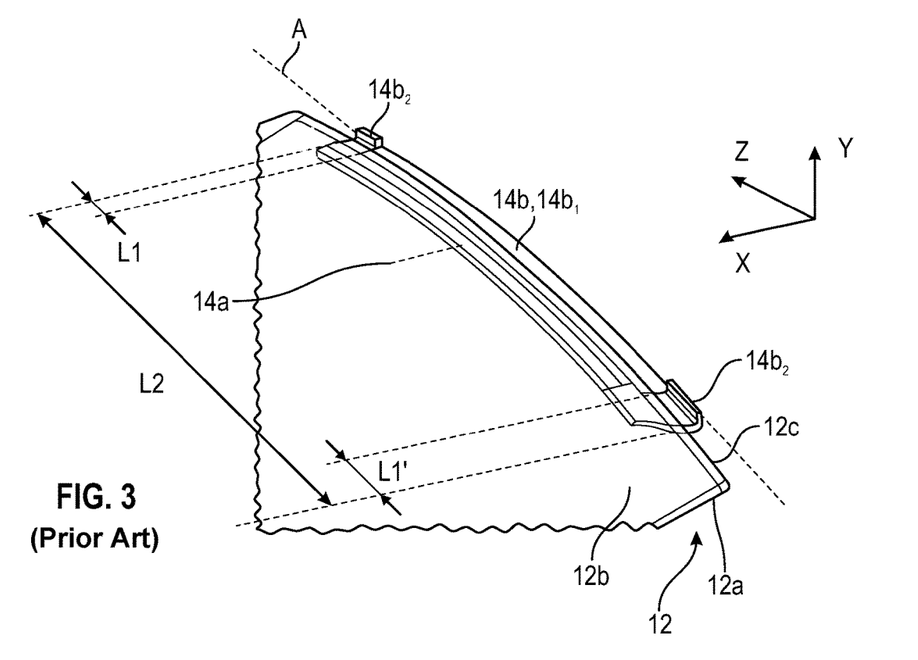
FIG. 3 is a schematic and partial perspective view of the sliding glazing of FIGS. 1 and 2 and shows the guide fastened to the glazing.
Figure 4:
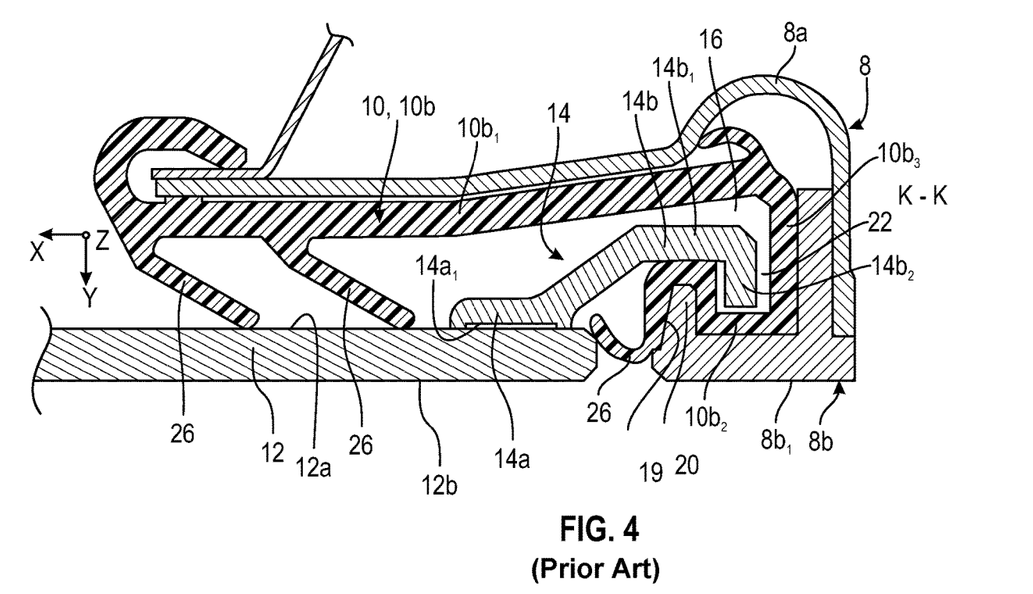
FIG. 4 is a schematic and partial cross-sectional view of the doorframe of FIG. 1 along line K-K, and shows the cooperation of the guide with the glass run seal.

In the current state of the art schematically represented in FIGS. 1 to 4, each longitudinal end of the guide portion 14*b* includes a free rib 14*b*2. Each free rib 14*b*2 extends outwardly from the wall 14*b*1 so as to provide the guide portion 14*b* with a cross sectional L-shaped at each of its longitudinal ends. The sectional view of FIG. 4 is performed in a plane crossing one of these ends. Each free rib 14*b*2 has a length L1, L1' measured along axis A which is short compared to the total length L2 of the guide 14 and which represents for instance less than 10% of this length L2 (FIG. 3). Between both free ribs 14*b*2, the guide portion 14*b* is cross sectional I-shaped.

As shown in FIG. 4, the outer branch 10*b*2 of the glass run seal 10 has an outer groove 19 receiving a rim 20 of the trim 8*b* and an inner groove 22 receiving both free ribs 14*b*2. The wall 14*b*1 cooperates by abutment with the branches 10*b*1, 10*b*2 so as to retain the glazing 12 in the direction Y, and the wall 14*b*1 is suitable to slide onto the outer branch 10*b*2 when the glazing 12 is moved. The free ribs 14*b*2 cooperate by abutment with lateral faces of the inner groove 22 so as to retain the glazing 12 in the direction X, and these free ribs 14*b*2 are suitable to slide onto these lateral faces when glazing 12 is moving.

Glazing 12 is moveable from an upright position shown in FIG. 1 to a downright position shown in FIG. 2. Glazing 12 is guided up to its downright position by cooperation of its lower free rib 14*b*2 with the inner groove 22 of the glass run seal 10. As shown in FIGS. 1 and 2, the strand 10*b* of the glass run seal 10 has therefore to extend along the whole length of the guide 14 when the glazing 12 is in its downright position. The strand 10*b* has therefore a relatively long length with a significant portion which extends below a belt line B of the door, inside the door frame 8, and which is therefore not visible by the user of the vehicle (see FIGS. 1 and 2). In the absence of such guidance, the lower free rib 14*b*2 might be retained by the lower end of the strand 10*b* in the direction Z and the lower end of the guide and of the glazing would not be guided and retained in the direction X.

Moving the glazing 12 is generally ensured by an electric motor which is mounted inside the door frame 8 or a panel of this door frame. The power of this motor is determined so as to move the glazing 12 taking into account the weight of the glazing and the frictional forces when the glazing is moving. These frictional forces are namely due to sealing lips 26 carried by the glass run seal 10 and cooperating by sliding with the glazing 12 (FIGS. 1 and 2) and mainly to the sliding of the guide 14 into the glass run seal 10 but also to the slight difference of curvature between the glazing 12 equipped with its guide 14 and the door and door frame: this difference of curvature can induce additional frictions during glazing up- or down-movements of the wall 14*b*1 and of the free ribs 14*b*2 onto the glass run seal 10.

The invention proposes a simple, effective and economical solution to at least one of the above problems.

DISCLOSURE OF THE INVENTION

For this purpose, the invention proposes a guide for a sliding glazing, in particular for an automobile, said guide being intended to be fastened onto a glazing and to cooperate with a glass run seal, said guide comprising a body made of a single piece and having an elongated shape along an axis, said body comprising:

a fastening portion extending along said axis and having a face configured to be fastened onto the glazing, and a guide portion extending along said axis and being cross sectional L-shaped, said guide portion comprising a wall substantially parallel to said face and a free rib substantially perpendicular to said face, said free rib including a first lateral face facing said fastening portion and a second lateral face opposite to said first lateral face, characterized in that at least one of said first and second lateral faces is non-planar and includes an alternation of bumps and hollows.

A "non-planar surface" according to the invention should be understood as a surface that is not smooth and that comprises to the contrary discontinuities such as bumps, hollows, protrudings, edges, etc. This surface may be contained in a single plane or may be curved and may therefore be for instance a portion of a cylindrical or spherical surface.

Contrary to the lateral faces of the free ribs of a prior art guide, at least one of the lateral faces of the free rib of the guide according to the invention is non-planar. The use of non-planar lateral face(s) allows reducing the surface(s) of the free rib in contact with the above mentioned glass run seal and then reducing the frictional forces when the sliding glazing is moved. The power necessary to move the glazing may therefore be lowered with respect to the prior art, and it is therefore conceivable to use a motor providing a power lower than in the prior art for moving the glazing.

The guide according to the invention can comprise one or several of the following characteristics, taken separately from one another or in combination with one another:
  both first and second lateral faces are non-planar;
  at least one of said first and second lateral faces is corrugated or wave-shaped.
  said free rib has a substantially constant thickness along said axis;
  said free rib is shaped as a wave or a ripple;
  said free rib includes an alternation of portions having a thickness E1 and portions having a thickness E2 which is different of E1
  said free rib is shaped as a pearl necklace;
  said wall and said free rib of said guide portion have a similar or identical length along said axis;
  said guide portion includes a single free rib;
  said wall is non-planar and/or has a non-constant thickness;
  said wall includes an outer face and an opposite inner face, said free rib extending from said outer face, at least one of said outer and inner faces being non-planar;
  both outer and inner faces are non-planar;
  at least one of said outer and inner faces includes an alternation of bumps and hollows;
  at least one of said outer and inner faces is corrugated or wave-shaped;
  said wall has a substantially constant thickness along said axis;
  said wall is shaped as a wave or a ripple;
  said wall includes an alternation of portions having a thickness E1 and portions having a thickness E2 which is different of E1
  said wall is shaped as a pearl necklace;
  E1 is lower than or equal to $0.85 \cdot E2$ or is higher than or equal to $1.15 \cdot E2$,
  E1 is higher than or equal to $0.30 \cdot E2$ or is lower than or equal to $1.7 \cdot E2$.

The invention also relates to a sliding glazing, in particular for an automobile, comprising a glazing and at least one guide as described above, said at least one guide being fastened onto an inner face of said glazing.

This invention further relates to a module, in particular for an automobile, comprising:
  a sliding glazing as stated above,
  a trim of a door frame, said trim extending along said axis and comprising an outer face intended to be substantially aligned with an outer face of said sliding glazing, and
  a glass run seal, said glass run seal comprising a strand which extends along said axis and which defines a recess for receiving said guide portion, said strand having an outer branch having an outer groove receiving a rim of said trim and an inner groove receiving said free rib.

Advantageously, said first and second lateral faces of said free rib are suitable to slide onto lateral faces of said inner groove, and said wall includes an outer face suitable to slide onto a portion of said outer branch defining said outer groove. Preferably, said strand of said glass run seal has a length which is lower than 150% of a guide length. Contrary to the prior art where the strand of the glass run seal has a length representing about 200% of the guide length, the length of the strand is reduced. This allows reducing the costs of the glass run seal and of the module. This is rendered possible by the single free rib which extends all along the length of the guide. This features allows further reducing the weight of the glass run seal and facilitating its mounting process.

The invention further proposes a guide for a sliding glazing, in particular for an automobile, said guide being intended to be fastened onto a glazing and to cooperate with a glass run seal, said guide comprising a body made of a single piece and having an elongated shape along an axis, said body comprising:
  a fastening portion extending along said axis and having a face configured to be fastened onto the glazing, and
  a guide portion extending along said axis, said guide portion comprising a wall substantially parallel to said face, characterized in that said wall is non-planar.

This guide may comprise one or more of the features described and listed above, taken separately one from another or in combination one with another.

DESCRIPTION OF THE FIGURES

The invention shall be better understood and other details, characteristics and advantages of the invention shall appear upon reading the following description given by way of a non-limiting example and in reference to the accompanying drawings, wherein.

DETAILED DESCRIPTION

FIGS. 1 to 4 have been described above and illustrate the prior art to the invention.

A first embodiment of the invention is shown in FIGS. 5 to 8.

Figure 5:
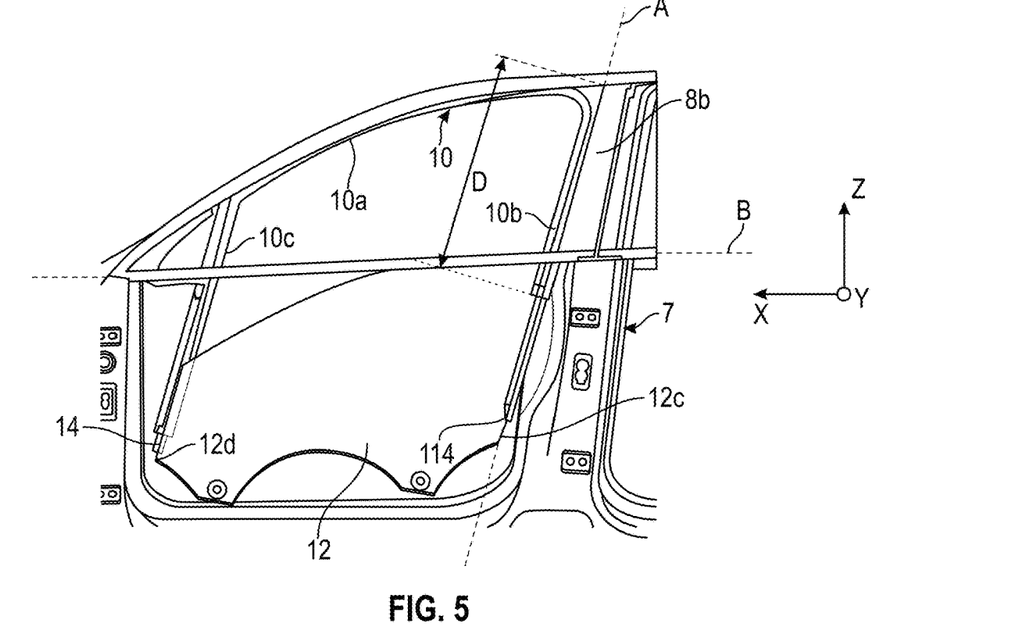
FIG. 5 is a schematic perspective view of a vehicle bodyside, this bodyside being equipped with a glass run seal and a sliding glazing according to an embodiment of the invention.
Figure 6:
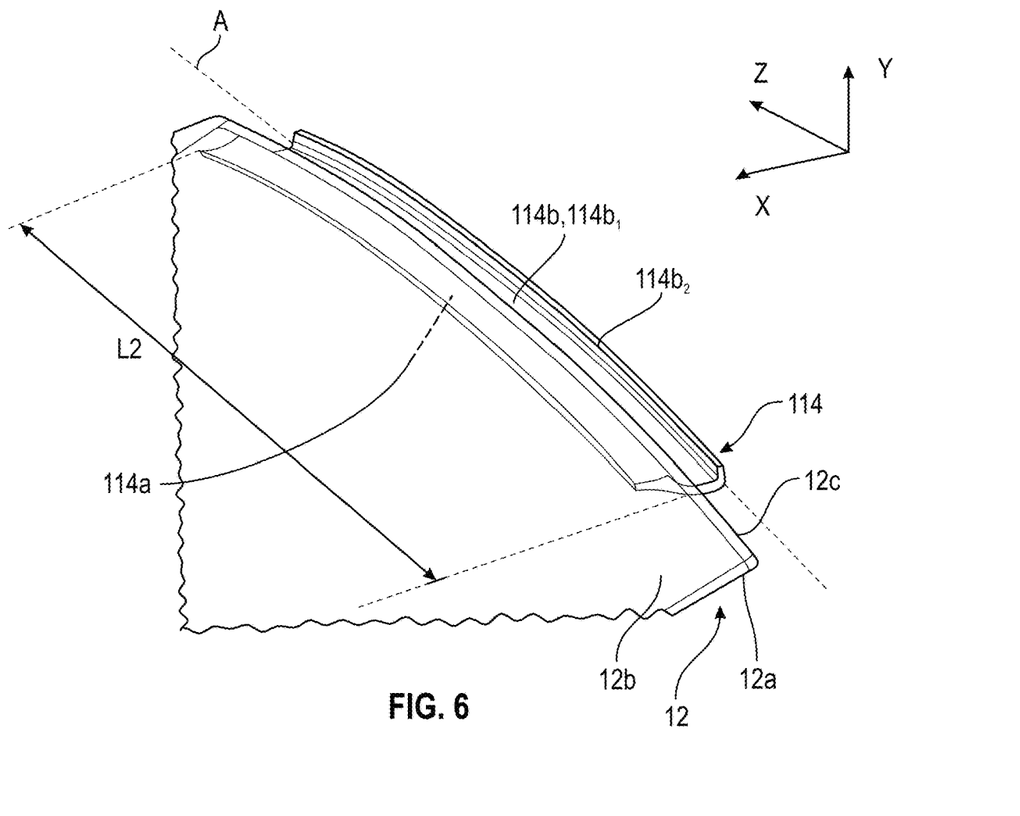
FIG. 6 is a schematic and partial perspective view of the sliding glazing of FIG. 5 and shows the guide fastened to the glazing.

FIG. 5 is a view similar to the one of FIG. 2 and FIG. 6 is a view similar to the one of FIG. 3.

FIG. 5 shows a glazing 12 and a glass run seal 10 as described above and differs from the ones of FIGS. 1 and 2 from two features.

As shown in FIG. 5, the length D of the strand 10b of the glass run seal 10 of FIG. 5 is shorter than the length D' of 4 of the strand 10b of the glass run seal 10 of FIG. 2. While the length D' represents about 200% of the length L2 of the guide 14 of the prior art (FIGS. 2 and 3), the length D represents less than 150%, and preferably less than or equal to 120%, of the length L2 of the guide 114 according to the invention (FIGS. 5 and 6). The strand 10b of the glass run seal 10 comprises therefore a short portion extending below the belt line B, which allows reducing the costs of the door frame or at least the module including the glass run seal 10 and the sliding glazing 12 provided with the guide 114 according to the invention.

The strand 10 of the glass run seal 10 may be made of a single elongated piece or made of two consecutive and independent elongated pieces, and for instance a first piece extending above the belt line B and a second piece extending below the belt line B.

Despite the fact that these features are illustrated in FIG. 2 at the rear side 12c of the glazing 12, they can of course be applied to the front side 12d of this glazing 12. That means, a glazing may be provided with a guide according to the invention on its front or rear side. In case where the glazing would be provided with two guides at its front and rear sides, only one of these guides may be according to the invention.

Reducing the length of the strand 10b of the glass run seal 10 is rendered possible by the guide 114 according to the invention and in particular by the fact that it includes a free rib 114b2 which extends all along the length of the guide 114, i.e., from its lower end to its upper end.

The guide 114 has an elongated shape and includes a fastening portion 114a and a guide portion 114b which are made as a single piece. The fastening portion 114a extends along the axis of elongation A of the guide and has a face 114a1 intended to be applied and fastened onto the inner face 12a of the glazing 12, for instance by gluing. The guide portion 114b extends along the axis A and comprises a wall 114b1 substantially parallel to the face 114a1 of the fastening portion 114a and to the glazing 12. This guide portion 114b is received in the recess 18 of the glass run seal 10 and cooperates by sliding with its outer branch 10b2.

Figure 8:
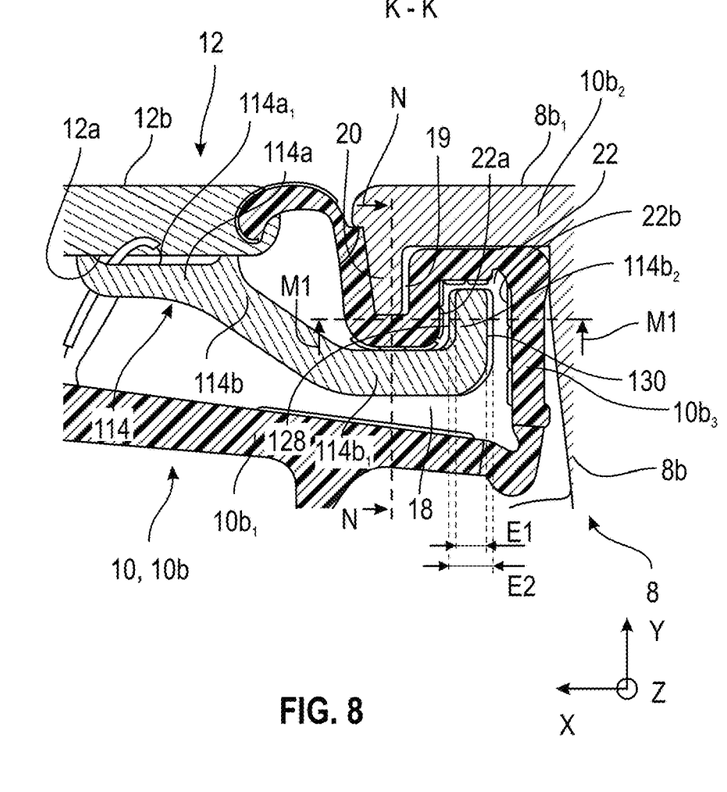
FIG. 8 is a schematic and partial cross-sectional view of a door frame similar to the one of FIG. 4, and shows the cooperation of the guide with the glass run seal.

The ascending strand 10b of the glass run seal 10 has a transversal or cross sectional section substantially in the shape of a U as described above and comprises two axially inner and outer branches 10b1, 10b2 connected together by a connection branch 10b3 (see FIG. 8). These branches 10b1, 10b2, 10b3 define therebetween the recess 18. The strand 10b is mounted onto the upright 8a of the frame of the corresponding door or onto the vertical trim 8b provided on this frame, and the outer face 12b of the glazing 12 laterally flushes with an outer face 8b1 of this trim 8b.

The outer branch 10b2 of the glass run seal 10 has an outer groove 19 receiving a rim 20 of the trim 8b and an inner groove 22 receiving the free rib 114b2. The wall 114b1 cooperates by abutment with the branches 10b1, 10b2 so as to retain the glazing 12 in the direction Y, and the wall 114b1 is suitable to slide onto the outer branch 10b2 when the glazing 12 is moved. The free rib 14b2 cooperates by abutment with lateral faces 22a, 22b of the inner groove 22 so as to retain the glazing 12 in the direction X, and this free rib 114b2 is suitable to slide onto these lateral faces 22a, 22b when glazing 12 is moving.

Glazing 12 is moveable from an upright position to a downright position as described above. Glazing 12 is guided up to its downright position by cooperation of its free rib 114b2 with the inner groove 22 of the glass run seal 10. Since the free rib 114b2 extends on the whole length of the guide 114, it cooperates with the lower end of the strand 10b which can be shortened as explained above. According to the invention, the frictional forces between the guide 114 and the glass run seal 10 are reduced when the glazing 12 is moving by using a guide 114 having one or more non-planar face(s).

The free rib 114b2 includes a first lateral face 128 facing the fastening portion 114a and a second lateral face 130 opposite to the first lateral face 128. At least one of these lateral faces 128, 130 is non-planar.

Figure 7:
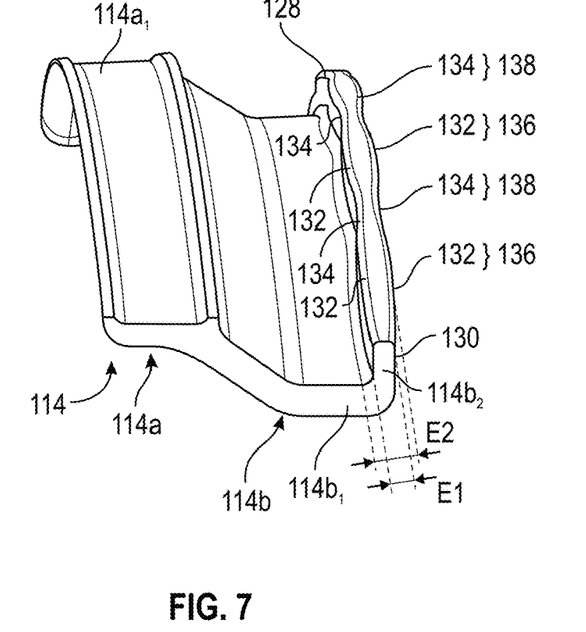
FIG. 7 is a schematic perspective view of the guide of FIG. 6.

FIGS. 7 and 8 show a first embodiment of the guide 114 wherein both faces 128, 130 are non-planar. Each face 128, 130 is corrugated or wave-shaped and includes an alternation of bumps 132 and hollows 134. The bumps 132 of the face 128 are transversely aligned with the bumps 132 of the face 130, and the hollows 134 of the face 128 are transversely aligned with the hollows 134 of the face 130 which provide the free rib 114b2 with an alternation of portions 136 (including the bumps 130) having a thickness E1 and portions 138 (including the hollows 134) having a thickness E2 which is different of E1, and in particular higher than E1. In this embodiment, the free rib 114b2 has a shape similar to a pearl necklace. Two adjacent portions 136 are separated by a portion 138, and two adjacent portions 138 are separated by a portion 136.

Preferably, the difference of thickness between E1 and E2 represents at least 15% of E1 or E2. In the present case, E2 is higher than or equal to 1.15·E1. The difference of thickness between E1 and E2 may be for instance at most 70% of E1 or E2. In this case, E2 would be equal to or lower than 1.70·E1.

Figures 11A, 11B:
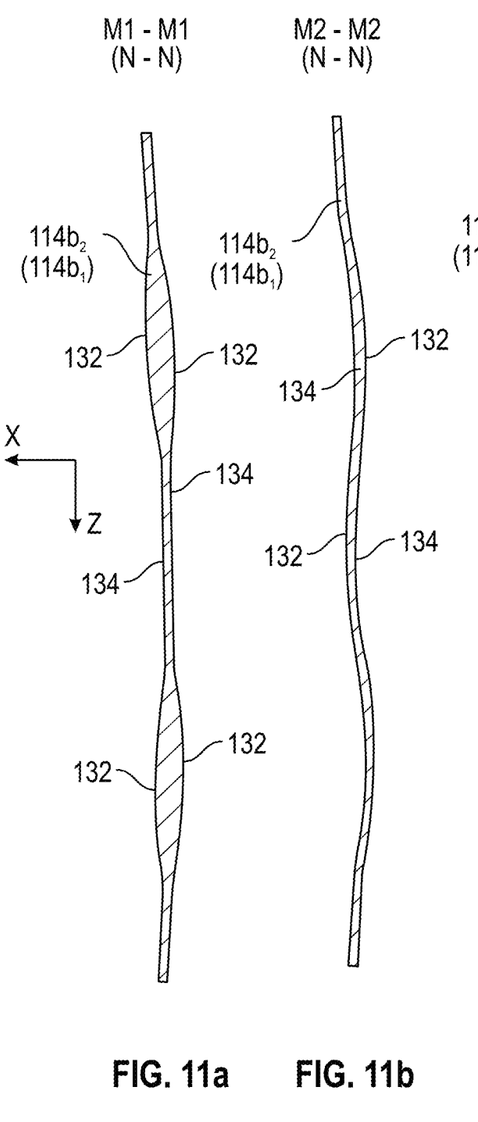
Figures 11C, 11D:
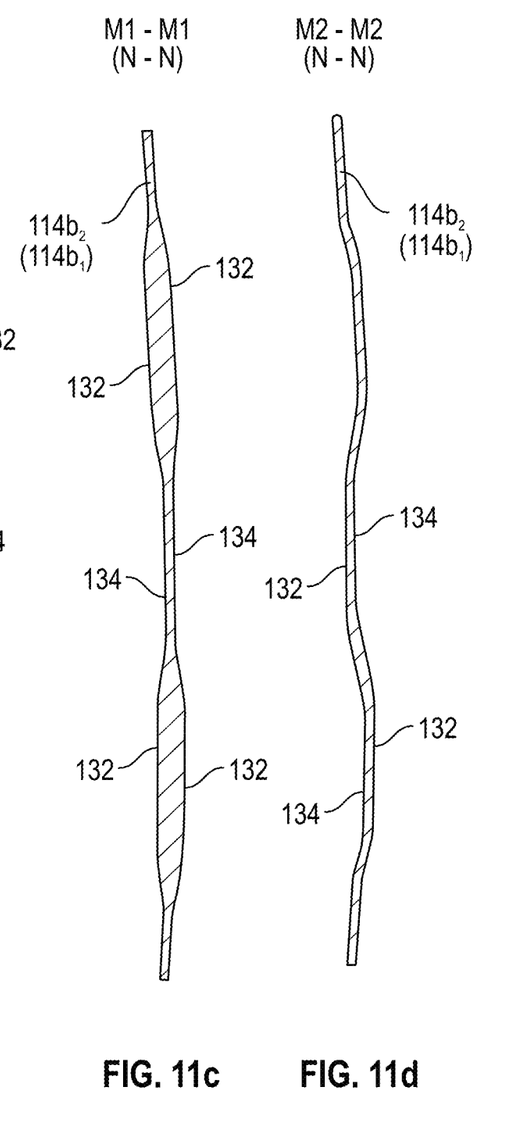

FIGS. 11a and 11c show that each bump 132 may have a curved top (FIG. 11a) or a planar top (FIG. 11c). The planar tops of the bumps 132 located on the face 128 may be parallel to the planar tops of the bumps 132 located on the face 130 as shown in FIG. 11c.

The shape of the bumps tops has an influence about the type of contact between the free rib 114b2 and the lateral faces 22a, 22b of the inner groove 22.

Figure 12A:
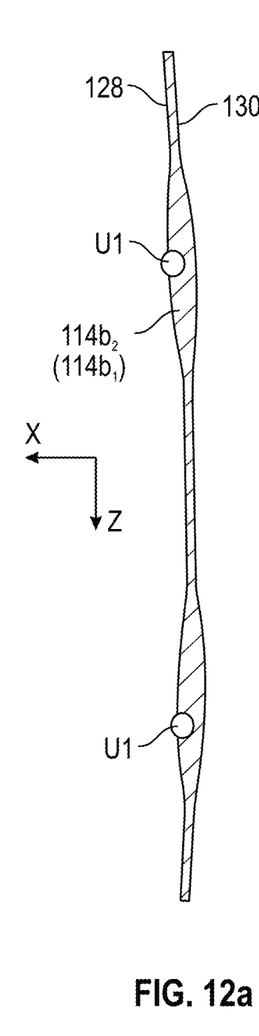
Figure 13A:
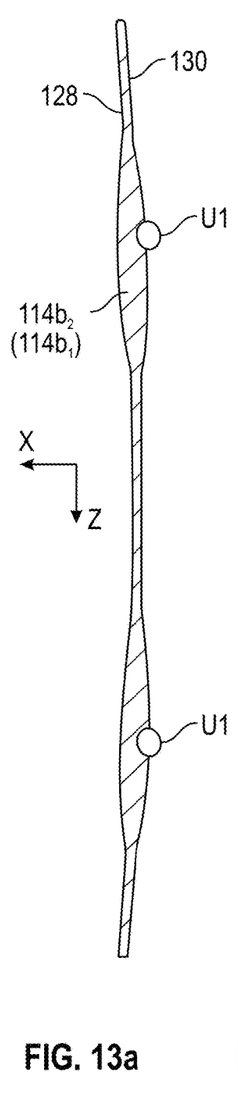
FIGS. 13a-13d are views similar to the ones of FIGS. 11a-11d and shows other contact zones of the guide.

FIG. 12a shows that the free rib 114b2 can come into contact with the face 22a in contact zones located on the tops of the bumps 132 and FIG. 13a shows that the free rib 114b2 can come into contact with the face 22b in contact zones located on the tops of the bumps 132. The tops of the bumps 132 are in contact with the faces 22a, 22b along lines U1 which are oriented in the direction Z. The contact lines U1 are illustrated by dots in FIGS. 12a and 13a. The height of dimension of the contact lines U1 along direction Z depends on the height or dimension of the free rib 114b2 along direction Z.

Figure 12B:
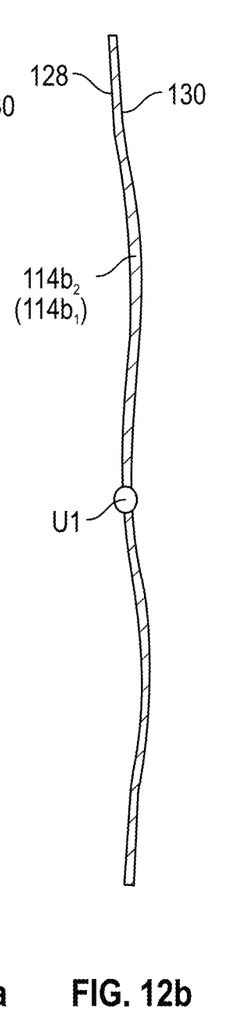
Figure 12C:
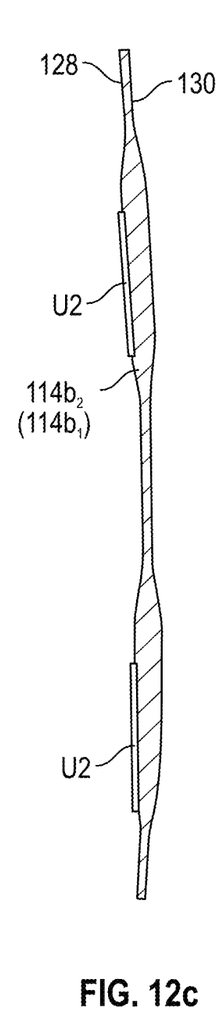

FIG. 12c shows that the free rib 114b2 can come into contact with the face 22a in contact zones located on the tops of the bumps 132 and FIG. 13a shows that the free rib 114b2 can come into contact with the face 22b in contact zones located on the tops of the bumps 132. The tops of the bumps 132 are in contact with the faces 22a, 22b along areas U2 which are parallel to direction Z. The contact areas U2 are illustrated by lines in FIGS. 12c and 13c.

Figure 9:
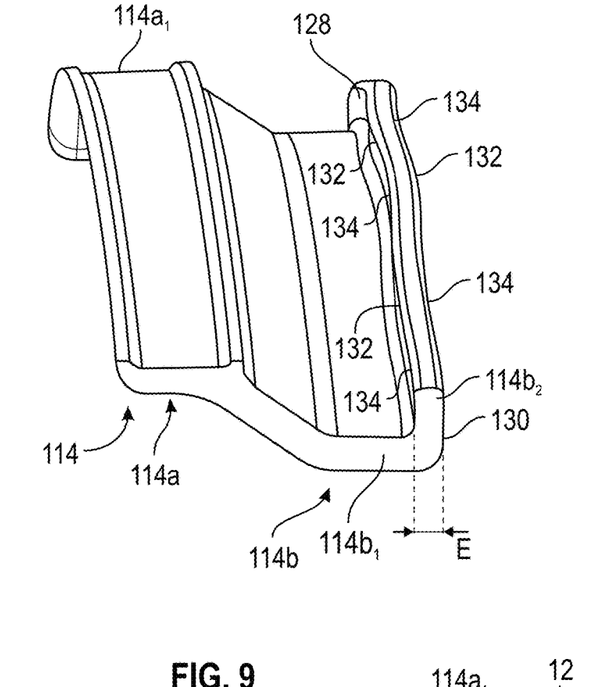
FIG. 9 is a view similar to the one of FIG. 7 and shows an alternative embodiment.
Figure 10:
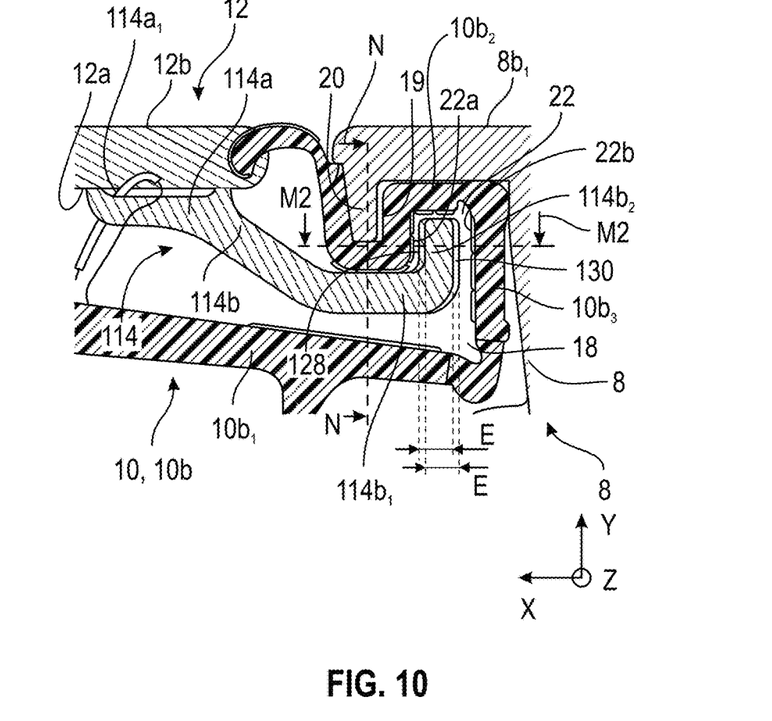
FIG. 10 is a view similar to the one of FIG. 8 with the guide of FIG. 9, FIGS. 11a-11d are sectional views of various embodiments of the guide according to the invention, FIGS. 11a and 11c being sectional views along lines M1-M1 or N-N of FIG. 8, and FIGS. 11b and 11d being sectional views along lines M2-M2 or N-N of FIG. 10, FIGS. 12a-12d are views similar to the ones of FIGS. 11a-11d and shows contact zones of the guide.

FIGS. 9 and 10 show a second embodiment of the guide 114 wherein both faces 128, 130 are non-planar. Each face 128, 130 is corrugated or wave-shaped and includes an alternation of bumps 132 and hollows 134. The bumps 132 of the face 128 are transversely aligned with the hollows 134 of the face 130, and the hollows 134 of the face 128 are transversely aligned with the bumps 132 of the face 130 which provide the free rib 114b2 with a substantially constant thickness E along axis A. In this embodiment, the free rib 114b2 has a shape similar to a wave or a ripple.

FIGS. 11b and 11d show that each bump 132 may have a curved top (FIG. 11b) or a planar top (FIG. 11d). The planar tops of the bumps 132 located on the face 128 may be parallel to the planar tops of the bumps 132 located on the face 130 as shown in FIG. 11d.

The shape of the bumps tops has an influence about the type of contact between the free rib 114b2 and the lateral faces 22a, 22b of the inner groove 22.

Figure 13B:
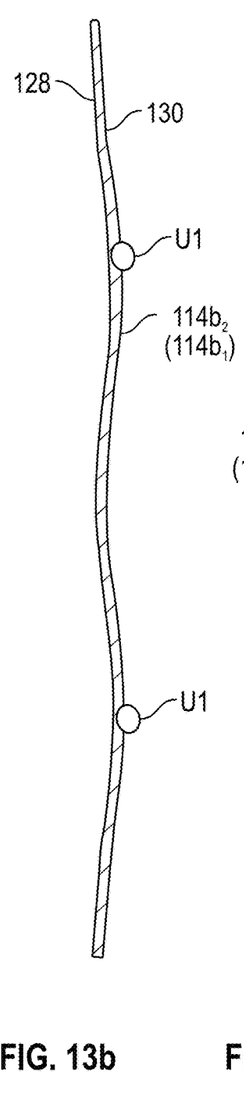

FIG. 12b shows that the free rib 114b2 can come into contact with the face 22a in contact zones located on the tops of the bumps 132 and FIG. 13b shows that the free rib 114b2 can come in contact with the face 22b in contact zones located on the tops of the bumps 132. The tops of the bumps 132 are in contact with the faces 22a, 22b along lines U1 which are oriented in the direction Z. The contact lines U1 are illustrated by dots in FIGS. 12b and 13b. The height of dimension of the contact lines U1 along direction Z depends on the height or dimension of the free rib 114b2 along direction Z.

Figure 12D:
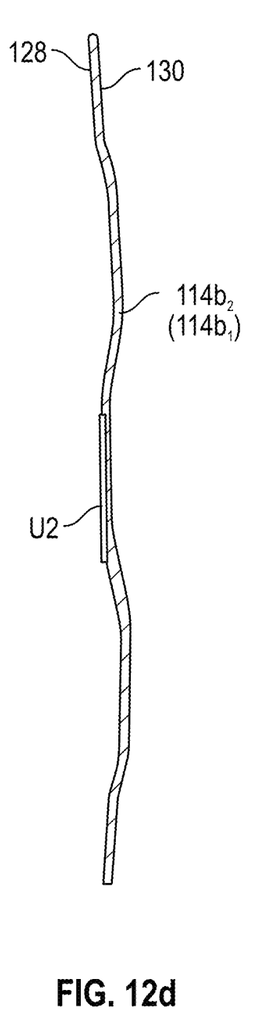
Figures 13C, 13D:
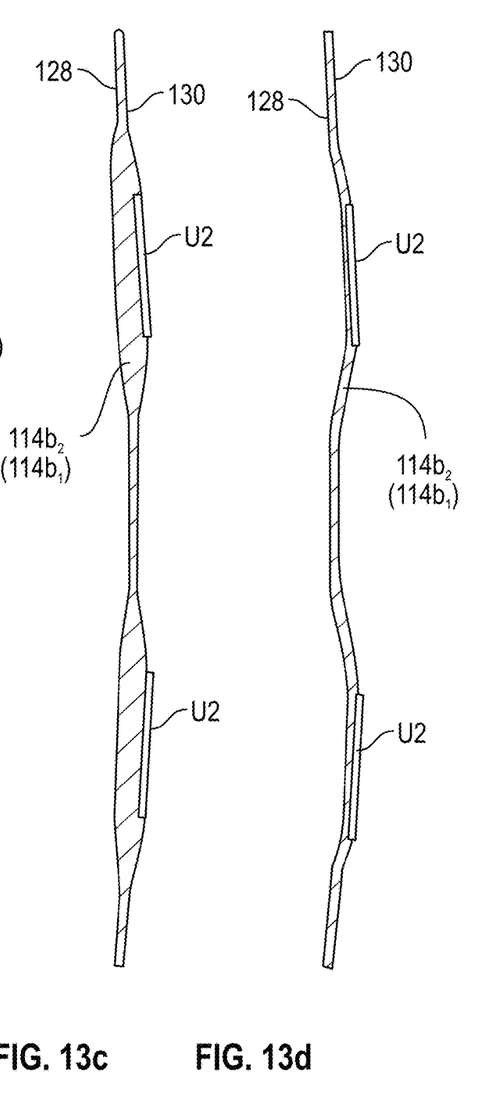

FIG. 12d shows that the free rib 114b2 can come into contact with the face 22a in contact zones located on the tops of the bumps 132 and FIG. 13d shows that the free rib 114b2 can come in contact with the face 22b in contact zones located on the tops of the bumps 132. The tops of the bumps 132 are in contact with the faces 22a, 22b along areas U2 which are parallel to direction Z. The contact areas U2 are illustrated by lines in FIGS. 12d and 13d.

According to other embodiments of the guide according to the invention, its wall 114b1 mays have an outer face 142 (intended to cooperate with the outer branch 10b2 and/or an inner face 144 (intended to cooperate with the inner branch 10b1) which is non-planar.

Figure 14:
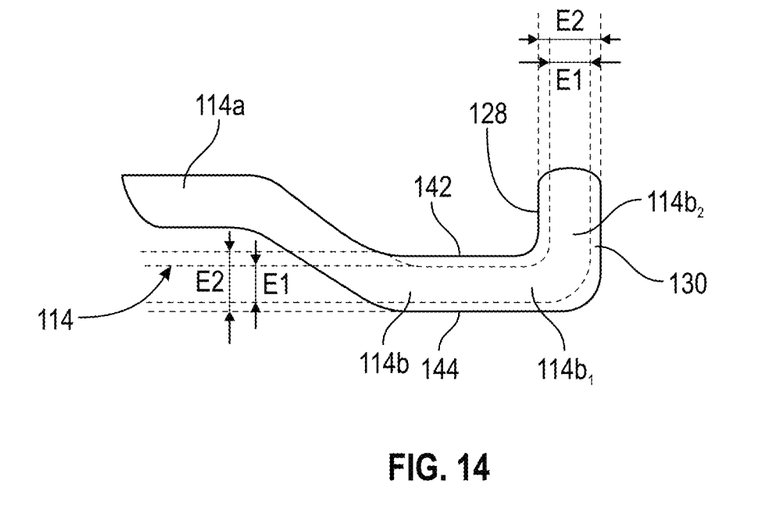
FIG. 14 is a schematic cross-sectional view of another embodiment of the guide according to the invention.

FIG. 14 shows a guide 114 having a wall 114b1 which is shaped as a pearl necklace as described above. The description of the pearl necklace free rib 114b2 in relation to FIGS. 6 to 8 applies therefore to the pearl necklace wall 114b1 of FIG. 14.

Figure 15:
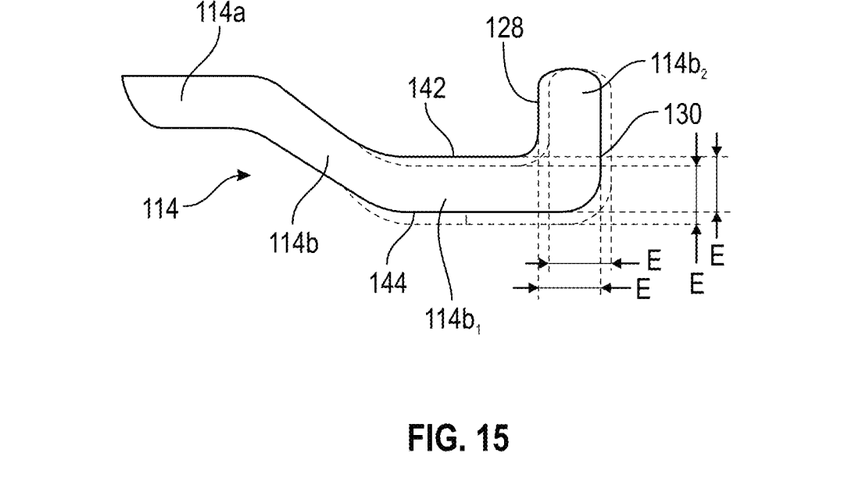
FIG. 15 is a schematic cross-sectional view of another embodiment of the guide according to the invention.

FIG. 15 shows a guide 114 having a wall 114b1 which is shaped as a wave or a ripple as described above. The description of the waved free rib 114b2 in relation to FIGS. 9 and 10 applies therefore to the waved wall 114b1 of FIG. 15.

The illustrations and descriptions of FIGS. 11a to 13d apply also to the guides 114 of FIGS. 14 and 15.

Depending on the amount and locations of the bumps of the free rib 114b1 and even of the bumps of the wall 114b1, the amount and locations of the contact zones along the guide may differ.

FIGS. 16a to 16d show various examples of the distribution of these contact zones. In these non limitative examples, the number of contact zones is three or four. One contact zone Z1 is preferably be located at each longitudinal end of the guide 114. That means a bump 132 or a portion of a bump is preferably located at each longitudinal end of the guide 114.

Figure 16A:
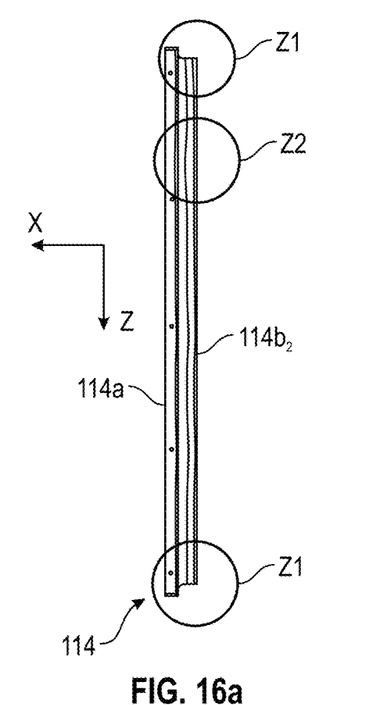
FIGS. 16a-16d are schematic perspective views of guides according to the invention and show various distributions of the contact zones along these guides.
Figure 16B:
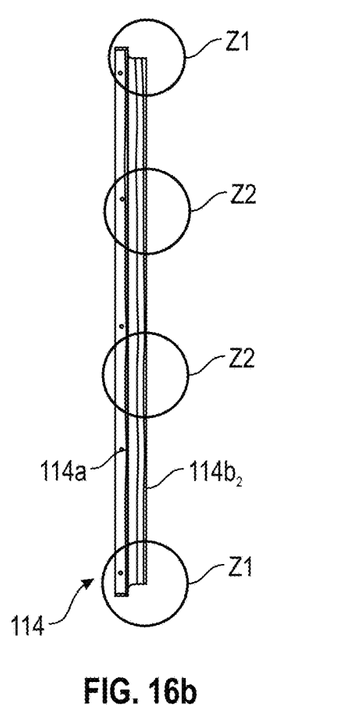
Figure 16C:
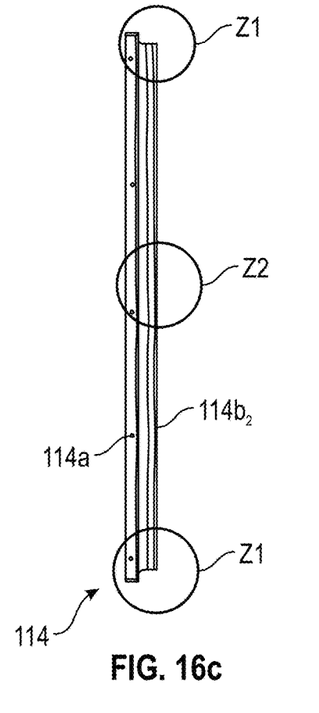
Figure 16D:
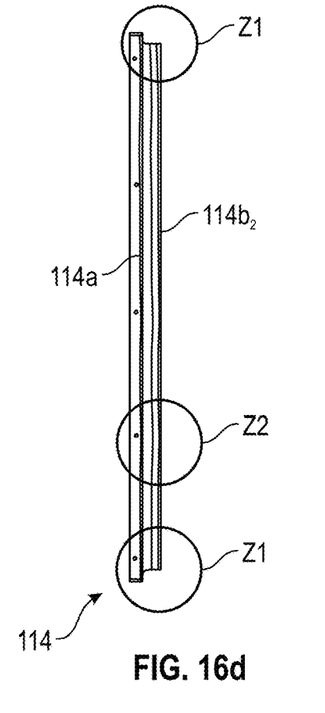

In case where the number of contact zones would be three, the third contact zone Z2 may be located at the middle of the guide 114 as shown in FIG. 16c, or close to one of the longitudinal ends of the guide 114 as shown in FIGS. 16a and 16d. In case where the number of contact zones would be four, the contacts zone Z1 and Z2 may be regularly distributed along the guide 114 as shown in FIG. 16b. Since the bumps 132 of the face 128 of the free rib 114b2 or of the face 142 of the wall 114b1 are not necessarily transversely aligned with the bumps on the opposite face 130 or 144, the locations and distribution of the contact zones may differ from one face 128, 142 to the other face 130, 144.

The invention claimed is:
1. A guide for a sliding glazing, said guide being intended to be fastened onto a glazing and to cooperate with a glass run seal, said guide comprising a body made of a single piece and having an elongated shape along an axis, said body comprising:
a fastening portion extending along said axis and having a face configured to be fastened onto the glazing, and
a guide portion extending along said axis and being cross sectional L-shaped, said guide portion comprising a wall substantially parallel to said face and a free rib substantially perpendicular to said face, said free rib including a first lateral face facing said fastening portion and a second lateral face opposite to said first lateral face,
wherein at least one of said first and second lateral faces is non-planar and includes an alternation of bumps and hollows.
2. The guide according to claim 1, wherein both first and second lateral faces are non-planar.

3. The guide according to claim 1, wherein at least one of said first and second lateral faces is corrugated or wave-shaped.

4. The guide according to claim 1, wherein said free rib has a substantially constant thickness along said axis.

5. The guide according to claim 1, wherein said free rib is shaped as a wave or a ripple.

6. The guide according to claim 1, wherein said free rib includes an alternation of portions having a thickness E1 and portions having a thickness E2 which is different of E1.

7. The guide according to claim 6, wherein E1 is lower than or equal to 0.85*E2 or is higher than or equal to 1.15*E2.

8. The guide according to claim 1, wherein said free rib is shaped as a pearl necklace.

9. The guide according to claim 1, wherein said wall and said free rib of said guide portion have a similar or identical length along said axis.

10. The guide according to claim 1, wherein said guide portion includes a single free rib.

11. The guide according to claim 1, wherein said wall is non-planar and/or has a non-constant thickness.

12. The guide according to claim 11, wherein said wall includes an outer face and an opposite inner face, said free rib extending from said outer face, at least one of said outer and inner faces being non-planar.

13. The guide according to claim 12, wherein at least one of said outer and inner faces includes an alternation of bumps and hollows.

14. A sliding glazing for an automobile, comprising a glazing and at least one guide according to claim 1, said at least one guide being fastened onto an inner face of said glazing.

15. A module for an automobile, comprising:
a sliding glazing according to claim 14,
a trim of a door frame, said trim extending along said axis and comprising an outer face intended to be substantially aligned with an outer face of said sliding glazing, and
a glass run seal, said glass run seal comprising a strand which extends along said axis and which defines a recess for receiving said guide portion, said strand having an outer branch having an outer groove receiving a rim of said trim and an inner groove receiving said free rib.

16. The module according to claim 15, wherein said first and second lateral faces of said free rib are suitable to slide onto lateral faces of said inner groove, and said wall includes an outer face suitable to slide onto a portion of said outer branch defining said outer groove.

17. The module according to claim 15, wherein said strand of said glass run seal has a length which is lower than 150% of a guide length.

* * * * *